No. 712,353. Patented Oct. 28, 1902.
J. ANSLEY.
VINEGAR FAUCET.
(Application filed Mar. 17, 1902.)
(No Model.)
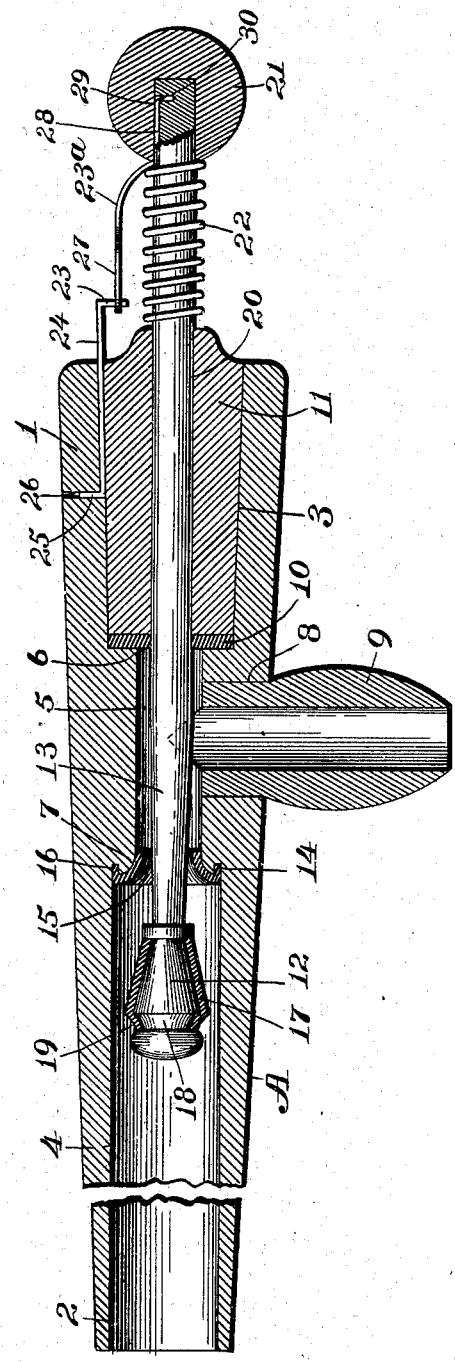
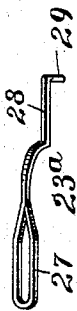
Witnesses
Percy C. Bowen
Arthur L. Bryant
Inventor
Joseph Ansley
By Watson & Watson
Attorneys

UNITED STATES PATENT OFFICE.

JOSEPH ANSLEY, OF SCRANTON, PENNSYLVANIA.

VINEGAR-FAUCET.

SPECIFICATION forming part of Letters Patent No. 712,353, dated October 28, 1902.

Application filed March 17, 1902. Serial No. 98,595. (No model.)

*To all whom it may concern:*

Be it known that I, JOSEPH ANSLEY, a citizen of the United States, residing at Scranton, in the county of Lackawanna, State of Pennsylvania, have invented certain new and useful Improvements in Vinegar-Faucets, of which the following is a specification.

The purpose of this invention is to provide a vinegar-faucet which is simple in construction and operation and in which the several parts will not be affected by the acid in the vinegar.

In the accompanying drawings, which illustrate the invention, Figure 1 is a longitudinal central section through the faucet, and Fig. 2 is a perspective view of the latch for holding the valve open.

Referring to the drawings, A indicates the faucet-body, which consists of a tubular wooden casing, the exterior of which tapers from its outer end 1 to its inner end 2, as shown. The casing has a tapering bore 3, extending longitudinally inward for a short distance from its outer end, and this tapering bore is connected to the inner tubular part 4 of the casing, which is of slightly less diameter, by a tubular opening 5 of less diameter than the parts 3 and 4, thus forming annular shoulders 6 and 7 at the opposite ends of the contracted portion of the casing. Between said shoulders a lateral outlet-opening 8 is formed in the casing, and a tap 9 is suitably secured within said opening. An acid-proof packing-ring 10, preferably of pure rubber, is placed against the shoulder 6, and this ring is held securely in position by a tubular wooden plug 11, which fits within the tapering bore 3. The shoulder 7, as shown, is rounding or tapering toward the opening 5 and forms a valve-seat for a tapering wooden valve 12, which is formed integral with or secured to a valve-stem 13. An annular recess 14 is formed around the shoulder 7, and a soft valve-seat 15, preferably made of pure rubber and formed to fit over the shoulder 7, has an annular flange 16, which fits into the recess 14 and holds the rubber in place. The conical valve 12 is also provided with an acid-proof cover 17, preferably of rubber, and the inner end of the valve is formed with a suitable recess 18, into which the end 19 of the rubber contracts, and the cover is thereby held in place upon the tapering valve. The valve-stem extends through the opening in the packing-ring 10 and through the opening 20 in the plug 11 and is provided with a handle 21 at its outer end. Between said handle and the plug 21 is arranged a spring 22, which surrounds the stem and tends to hold the valve 12 to its seat. In order to hold the valve open when desired, a hook 23, secured to the faucet-casing, is arranged so that it may be engaged by a latch 23$^a$, attached to the valve-stem. The shank 24 of the hook is arranged within a groove in the inner wall of the casing and has an outwardly-turned end 25, fitting within a recess 26 in the casing. The shank of the hook is held in place by the plug 11. The spring-latch has a loop 27, adapted to engage the hook 23, and the shank 28 of the latch is arranged within a longitudinal groove in the valve-stem and is held in place by the knob or handle 21, which fits over the shank. The shank is provided with an inwardly-turned end 29, which extends into a recess 30 in the stem. When it is desired to hold the valve open for any length of time, the stem is pushed inwardly against the action of the spring, and the latch may then be engaged with the hook, as shown in Fig. 1, by depressing the latch and then allowing it to spring outwardly into engagement with the hook in an obvious manner. Of course, if desired, the hook may be attached to the valve-stem and the latch attached to the casing.

The wooden parts of the faucet are rendered acid and water proof by treatment with hot paraffin and Japan wax, which are forced into the wood under high pressure, and the rubber upon the valve and valve-seat is cemented in place by a suitable cement, which will not be affected by the acid in the vinegar.

The packing-ring 10 is held firmly against the valve-stem by the plug, which fits against it, and this plug may be driven tightly into the tapering bore 3, or it may be made to fit closely within the bore, so as to be readily removable, and be held in place by the spring 22.

It will be seen that the several parts of the faucet with which the vinegar comes in contact are acid-proof and that the spring for closing the valve shut and the devices for holding the valve open are protected from the vinegar by the plug and packing-ring.

Having described my invention, what I claim, and desire to secure by Letters Patent, is—

1. A vinegar-faucet comprising a tubular wooden casing having an intermediate portion of its bore of less diameter than the end portions, forming shoulders therewith, a lateral outlet-opening between said shoulders, a packing-ring fitting against the outer shoulder, a tubular plug fitting into the outer end of the casing and against said packing-ring, a wooden valve-stem extending through said plug and ring and having a valve at its inner end adapted to seat against the inner shoulder, a handle on the outer end of said stem and a spring surrounding the stem and interposed between the handle and the plug.

2. A vinegar-faucet comprising a tubular wooden casing having an intermediate portion of its bore of less diameter than the end portion, forming shoulders therewith, a lateral outlet-opening between said shoulders, a recess surrounding the inner shoulder, a rubber cover extending over the shoulder and having its outer edge extending into the recess, a rubber packing-ring fitting against the outer shoulder, a tubular plug fitting into the outer end of the casing and against said packing-ring, a wooden valve-stem extending through said plug and ring and having a valve at its inner end adapted to seat against the inner shoulder, a rubber covering upon said valve and a spring surrounding the stem and interposed between the handle and the plug.

3. The combination with a faucet comprising a tubular casing having a valve-seat therein, a plug closing the outer end of the casing, a valve-stem extending through said plug and having a valve at its inner end adapted to fit against said seat and a knob at its outer end, and a spring arranged to hold said valve against its seat, of fastening devices arranged to hold the valve off of the seat, against the action of the spring, comprising two parts adapted to interlock, one of said parts having a shank extending between the plug and the valve-casing and the other part having a shank extending between the valve-stem and the knob.

4. The combination with a faucet comprising a tubular casing having a valve-seat therein, a plug closing the outer end of the casing, a valve-stem extending through said plug and having a valve at its inner end adapted to fit against said seat and a knob at its outer end, and a spring arranged to hold said valve against its seat, of fastening devices arranged to hold the valve off of the seat, against the action of the spring comprising two parts adapted to interlock, one of said parts having a shank extending between the plug and the valve-casing and the other part having a shank extending between the valve-stem and the knob, said shanks having projections fitting into recesses in the casing and stem respectively.

5. The combination with a faucet comprising a tubular casing having a valve-seat therein, a plug closing the outer end of the casing, a valve-stem extending through said plug and having a valve at its inner end adapted to fit against said seat and a knob at its outer end, and a spring arranged to hold said valve against its seat, of a hook at the outer end of the casing having its shank secured between the plug and the casing, and a latch adapted to engage said hook, said latch having its shank secured between the knob and the valve-stem.

In testimony whereof I affix my signature in presence of two witnesses.

JOSEPH ANSLEY.

Witnesses:
R. M. SPEICH,
C. D. BEEBE.